United States Patent [19]
Flory

[11] 3,896,620
[45] July 29, 1975

[54] TWO-STAGE ACCUMULATOR VALVE

[75] Inventor: Donald M. Flory, Arcanum, Ohio

[73] Assignee: General Motors Corporation, Detroit, Mich.

[22] Filed: Jan. 14, 1974

[21] Appl. No.: 433,204

[52] U.S. Cl. .............................. 60/547; 91/391 R
[51] Int. Cl. ............................................ F15b 7/00
[58] Field of Search ................. 60/547, 581, 413; 91/391 R

[56] References Cited
UNITED STATES PATENTS
| | | | |
|---|---|---|---|
| 3,638,528 | 1/1972 | Lewis | 60/413 |
| 3,751,912 | 8/1973 | Bach | 60/413 |

*Primary Examiner*—Martin P. Schwadron
*Assistant Examiner*—H. Burks, Sr.
*Attorney, Agent, or Firm*—K. H. MacLean, Jr.

[57] ABSTRACT

A hydraulic brake booster assembly having a pressure chamber within a housing adapted to receive high pressure hydraulic fluid from a source which exerts a pressure force upon a power piston to pressurize brake fluid in an associated master cylinder assembly. A fluid accumulator stores pressurized hydraulic fluid for discharge into the pressure chamber in the event that the pressure source cannot provide adequate pressure. An accumulator valve releases the stored pressurized fluid into the power chamber when needed and includes a valve seat member having a valve passage therethrough which is normally closed by a movable valve member. A bleed passage in the valve member is aligned with the passage in the valve seat and has a check valve therein. A valve actuator includes a portion extending into the bleed passage to engage the check valve therein and thereby to pass pressurized fluid from the accumulator through the bleed passage into the pressure chamber. This flow produces a reaction force upon the valve member which tends to open it.

3 Claims, 5 Drawing Figures

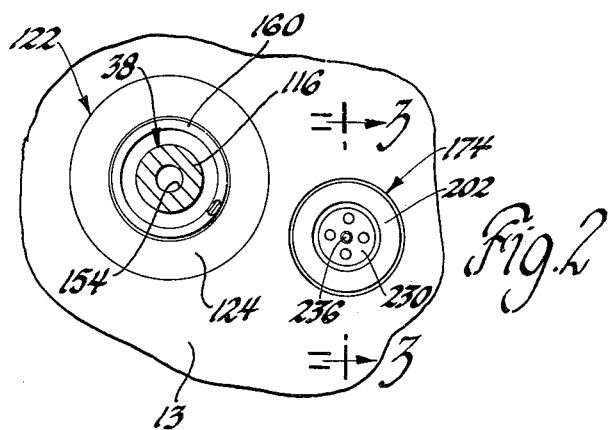
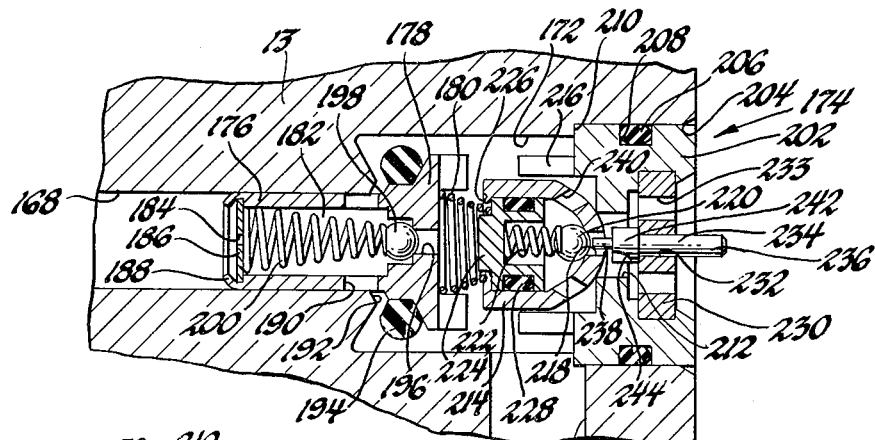
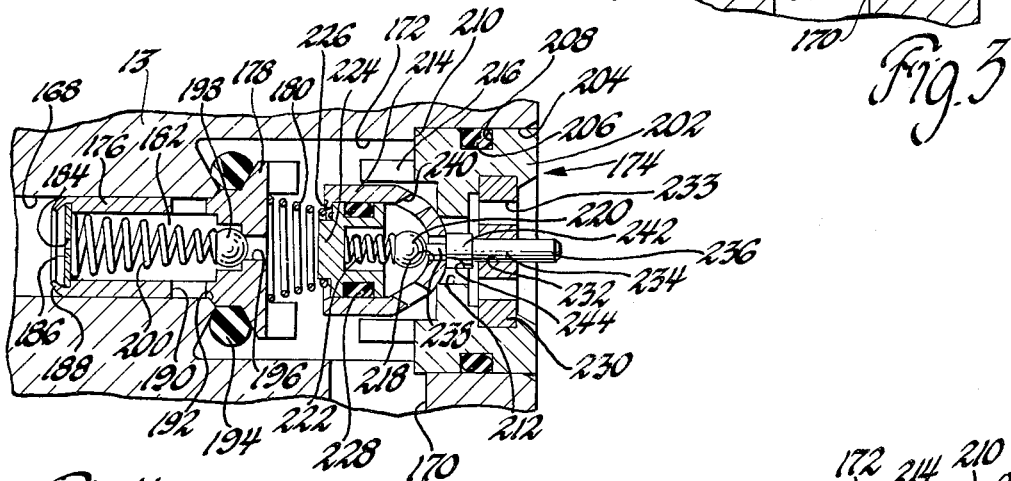
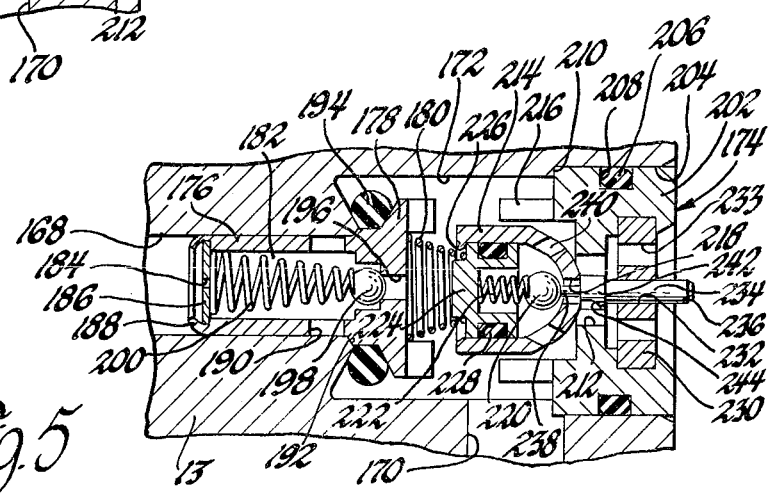

3,896,620

1

TWO-STAGE ACCUMULATOR VALVE

This invention relates to hydraulic brake booster assemblies and to an improved valve for controlling fluid discharge from a fluid accumulator to a pressure chamber.

The utilization of hydraulic pressure to activate and power pressure means for brake fluid is well known. It is also known to use a vehicle power steering pump as a pressure source for activating brake boosters of the hydraulic type. In this connection, it is common to provide a high pressure fluid storage or accumulator means to provide a quantity of pressurized fluid for use whenever the power source fails to supply adequate pressure for braking.

The present invention utilizes a fluid accumulator for storing high pressure fluid and provides an improved accumulator release valve to discharge high pressure fluid into the booster power chamber. The improved valve utilizes an initial flow of pressurized fluid through a bleed passage to produce a reaction force on the main valve member tending to open it. This supplemental opening force decreases the applied force necessary to open the valve by movement of an operator-actuated member such as a brake pedal.

Therefore, an object of the present invention is to provide an improved accumulator valve for hydraulic brake boosters having an initial opening force provided by reaction to fluid flow through a bleed passage.

Another object of the invention is to provide an improved accumulator valve including a valve seat having a fluid passage therethrough which is normally closed by a valve member which has a bleed passage aligned with the valve seat passage and a check valve therein which is unseated by a pin actuator to permit high pressure fluid to flow through the bleed passage thus producing a reaction force on the valve member causing it to open.

A further object of the present invention is to provide an improved fluid accumulator valve for hydraulic brake boosters including a valve seat and a valve member for controlling fluid flow through a valve seat passage and having a bleed passage aligned with the valve seat passage so that a flow of fluid through the bleed passage produces a reaction force tending to open the main valve member.

Further objects and advantages of the present invention will be more readily apparent from the following detailed description, reference being had to the accompanying drawings which illustrate a preferred embodiment.

In the Drawings:

FIG. 2 is a sectioned view of the subject accumulator valve taken along section line 2—2 of FIG. 1 and looking in the direction of the arrows;

FIG. 3 is a sectioned view of the accumulator valve in a charging mode of operation taken along section line 3—3 in FIG. 2 and looking in the direction of the arrows;

FIG. 4 is a sectioned view of the accumulator valve similar to FIG. 3 and showing the valve in an initial opening mode of operation; and FIG. 5 is a sectioned view of the accumulator valve similar to FIG. 3 showing the valve in a fully opened mode of operation.

2

Figure 1:
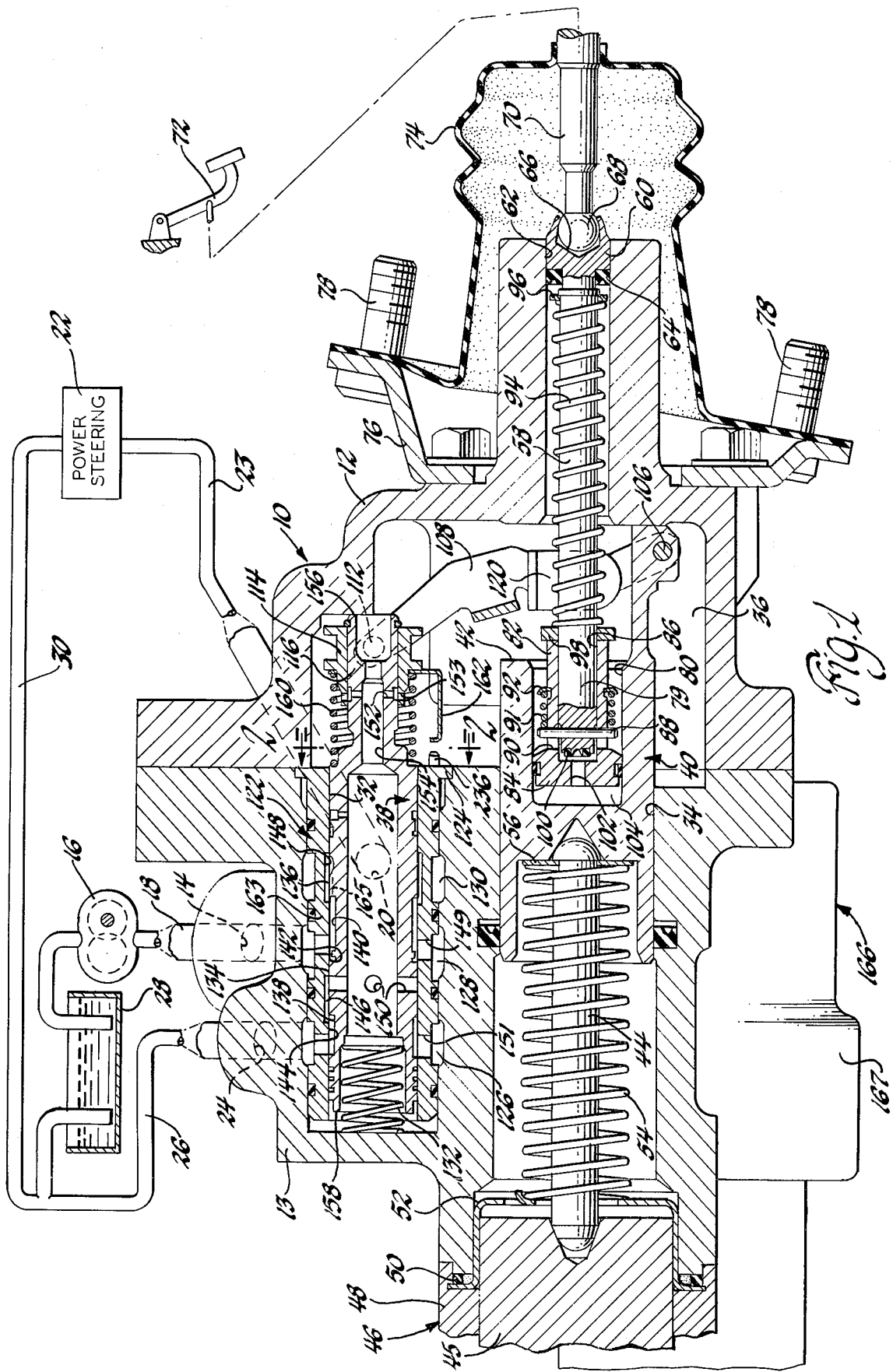
FIG. 1 is a schematic view of a hydraulic brake system including a sectioned view of the present booster assembly.

In FIG. 1 of the drawings, a hydraulically actuated brake system is illustrated. Specifically, a hydraulic brake booster assembly 10 includes housings 12 and 13. The housing 13 has an inlet 14 communicated to the outlet or high pressure side of a vehicle power steering pump 16 by a conduit 18. An outlet port 20 in housing 13 is fluidly communicated to the inlet of the vehicle power steering gear 22 by a conduit 23. The housing 13 has an exhaust port 24 therein connected by a conduit 26 to a reservoir 28. The outlet of the power steering assembly 22 is also connected to reservoir 28 by a conduit 30.

Assembly 10 has a first valve bore 32, a second power bore 34, and a pressure chamber 36 within the housings. A spool valve 38 is slidably mounted in the valve bore 32 and is adapted to control communication between inlet 14, outlet 20 and exhaust port 24. A large power piston 40 is slidably mounted in the bore 34 and has an end portion 42 which projects into the pressure chamber 36. A rod 44 connects piston 40 to a piston 45 of a standard master cylinder assembly 46 which is mounted to the left of the housing 12 (only a portion of a master cylinder housing 48 is visible). An O-ring 50 is placed between the housing 13 and housing 48 to prevent fluid leakage therebetween. In addition, the other edge of a spring retainer member 52 is supported between housings 13 and 48. The central portion of the retainer 52 engages one end of a coil spring 54. The other end of spring 54 engages a washer 56 located adjacent the end of the piston 40. The spring 54 urges piston 40 to the right in FIG. 1 towards the brake release position illustrated.

A control rod 58 within the housing 12 has an enlarged end portion 60 reciprocally mounted within bore 62 in housing 12. An annular seal 64 prevents fluid leakage from the chamber 36. The end 60 of rod 58 forms a socket at 66 which engages a rounded portion 68 of a push rod 70. The push rod 70 is operably connected to a brake pedal assembly 72 for actuation of the brake system by the vehicle operator. The push rod 70 extends through a flexible boot member 74 which may be made of a material such as rubber and which is attached to a mounting flange 76 having fasteners 78 for attaching the brake booster assembly 10 to the vehicle. The other end 79 of the control rod 58 extends into a bore 80 within power piston 40. More particularly, the end 79 engages a small piston 82 having an enlarged head portion 84 which is adapted to reciprocate within bore 80. The piston 82 has an opening 86 encircling the end 79 of rod 58 which permits the piston 82 to slide along the end of the rod to the extent permitted by interaction between a pin member 88 and a slot 90 in the piston 82.

A spring 91 encircles the piston 82 and is engaged at one end by the pin 88 and at the other end by retainer 92. A long spring 94 encircles the control rod 58 and extends from a retainer 96 on end 60 to a washer member 98 adjacent piston 82. Spring 94 has a greater spring rate than spring 91 and thus the piston 82 normally is maintained against pin 88 as shown in FIG. 1. When the pedal means 72 and push rod 70 are activated to urge the control rod 58 to the left, high pressure hydraulic fluid normally will be introduced to the chamber 36 and will press against the end 42 of piston 40 to move piston 40, rod 44, and master cylinder piston 45 to the left. However, if there is a pressure failure of the fluid source (pump 16), the end 79 of the control rod 58 moves to the left in piston 82 causing O-ring 100 to engage the end of the piston 82 thus blocking the bleed hole 102 to chamber 104. This traps hydraulic fluid in the chamber 104 and prevents the control rod 58 and piston 40 from moving independently of one another, thus directly transferring force from rod 58 to the rod 44 and master cylinder piston 45 to provide manual actuation of the brake.

One end of a lever 108 is attached by a pivotal fastener 106 to an extension of piston 40. A second pivotal fastener 112 connects the other end of the lever 108 to a piston member 114 which is slidably mounted on a reduced diameter portion 116 of the spool valve 38. The mid-portion of lever 108 is connected to a bracket member 120 which slides on the rod 58 and is engaged by spring 94. The spring 94 yieldably urges the lever 108 to move with movements of control rod 58 and push rod 70.

The spool valve 38 is reciprocally mounted within bore 32 which is formed in a sleeve member 122 which has an enlarged head portion 124 for axially positioning the sleeve member in the housing portion 13. Annular fluid passages 126, 128 and 130 are formed between the housing 12 and sleeve member 122 and communicate respectively with exhaust port 24, the inlet port 14 and the outlet port 20. O-rings are located to either side of the passages 126, 128 and 130 to prevent fluid leakage therefrom. Spring 132 exerts a force on the spool valve 38 to move it to the right in FIG. 1.

Spool valve 38 includes annular lands 134 and 136 and grooves 138 and 140 which cooperate with annular lands 142 and 144 and grooves 146 and 148 within the sleeve member 122 to control fluid communication into and out of the pressure chamber 36. The inlet port 14 is communicated by a passage 149 with groove 140. The outlet port 20 is likewise communicated with groove 148 and the return port 24 is communicated by a passage 151 with the groove 138. Passages 150, 152 and 154 in the spool valve 38 communicate the return port 24 with the pressure chamber 36 when the spool valve is in a first operative positon shown in FIG. 1 which corresponds to non-braking operation of the booster assembly. The spool valve 38 is shiftable from the first operative position which is characterized by engagement of end 156 with housing 12 to a second operative position characterized by engagement of the other end 158 of valve 38 with the housing portion 13. This second operative position corresponds to a normal application of the brakes. The spring 160 urges the small piston member 114 to the right on the reduced diameter portion 116 of valve 38 in FIG. 1. This aligns passages 152 and a passage 153 in the piston 114 to permit fluid flow from inlet 14 into the pressure chamber 36. The spring 160 also retains a valve actuator member 162 against piston member 114 for movement together. The function of the actuator member 162 will be described hereafter in connection with the operation of the fluid accumulator.

When the brakes are applied, valve 38 is moved to the left in FIG. 1 towards the aforedescribed second position to cause land 136 on the valve 38 to cooperate with portion 163 of sleeve 122 and produce a flow restriction through groove means in land 136 which are denoted by the hidden line 165. The flow restriction through the groove means causes the fluid pressure to increase in the inlet port 14 and in groove 140 when the brakes are applied. A portion of this pressurized fluid is communicated to the pressure chamber 36 by flow between lands 134 and 142, through groove 146 and hence through passages 150, 152, 153, and 154. The fluid pressure communicated to the pressure chamber 36 acts against the end 42 of piston 40 to urge the piston to the left in FIG. 1. This movement of piston 40 is transmitted by rod 44 to the master cylinder assembly 46 in which brake pressure is generated.

Although a portion of the fluid during braking application is directed to the pressure chamber 36, the greater part of the fluid flow will be passed to outlet port 20 through the groove means 165 and on to the power steering gear 22.

The foregoing describes the operation of the booster assembly during braking when adequate fluid pressure from the power steering pump 16 is available for necessary braking action. During this period, spool valve 38 is in its second or leftward position with its end 158 against housing 13. The restriction caused by groove means 165 causes the pressure in the inlet to increase. This increased pressure is communicated to a fluid accumulator 166 in FIG. 1 which defines a variable volume pressure chamber therein. The accumulator 166 has a rigid wall member 167 to contain the high pressure fluid which is preferably a portion of housing 13. The increased pressure at the inlet 14 is communicated to the pressure chamber of the accumulator through a passage 168 in housing 13 (see FIGS. 3–5). The high pressure fluid is stored within the accumulator until needed for pressurization of chamber 36. For more details of a preferred accumulator, reference is made to a copending U.S. patent application entitled "Hydraulic Brake Accumulator" by Edward J. Dehoff and which was filed Nov. 26, 1973 and has been given Ser. No. 419,090 which is assigned to General Motors Corporation.

The high pressure storage space or chamber within accumulator 166 is connected by a passage 170 in housing 13 to a space formed by a bore 172 in housing 13. The bore 172 is located adjacent to the spool valve 38 and sleeve member 122 as shown in FIGS. 1 and 2. The bore 172 supports a valve assembly 174 having an inlet valve portion and an outlet valve portion.

The inlet valve portion in FIG. 3 is shown in an open operational position and includes a reciprocally mounted piston valve member including a cylindrical portion 176 and an enlarged head portion 178. The cylindrical portion 176 is supported within the passage 168 and is movable therein against the force of a spring 180. Portion 176 has a hollow interior defining an interior space 182 which is communicated with the passage 168 through a small orifice opening 184 in an orifice plate 186 which is secured to member 176 by a turned or spun over portion 188.

Portion 176 has a number of radially extending passages 190 connecting space 182 with the chamber formed within bore 172 and the passage 170 which leads to the pressure storage interior of accumulator 166.

The enlarged head portion 178 of the inlet valve portion is pressed by spring 180 to the left in FIG. 3 against seat portion 192 of housing 13 when the pressure in passage 168 is insufficient to produce an opening movement of the inlet valve. An O-ring 194 engages the housing 13 to prevent fluid leakage between the inlet valve and the housing 13 when in a closed operative position as shown in FIGS. 4 and 5.

A central passage 196 in the enlarged head portion 178 of the inlet valve serves as a pressure release passage in the event the pressure within the accumulator increases above a maximum level. A spherical relief valve 198 is normally biased by a spring 200 against the passage 196 to prevent the escape of pressurized fluid from the accumulator. However, when the pressure in the accumulator and passage 170 exceeds the predetermined pressure needed to unseat valve member 198, excess fluid is discharged through passage 196 and orifice 184 to passage 168 and inlet 14.

The present invention is primarily concerned with the outlet valve portion of the valve assembly 174. A valve seat member 202 is supported within an enlarged diameter portion 204 of bore 172. An O-ring 206 is supported within a groove 208 in the valve seat member to prevent fluid leakage between the members. The valve seat member 202 is secured within the enlarged diameter portion 204 and against a shoulder 210 by staking or equivalent means.

The valve seat member 202 has a passage 212 therethrough which communicates the storage space of the accumulator and passage 170 with the pressure chamber 36 located to the right of the valve seat member 202 shown in FIGS. 3-5. A cup-shaped and hollow main valve member 214 is normally biased against the valve passage 212 by spring 180 to prevent fluid flow from passage 170 to chamber 36. A number of circumferentially spaced and axially extending arms 216 encircle the main valve member 214 to guide its opening movement to the left against the force of spring 180 as shown in FIGS. 3-5. The main valve member 214 has a bleed passage 218 therethrough which is substantially aligned with the main passage 212. Fluid flow is normally prevented from passing through the bleed passage 218 by a spherical check valve 220 which is biased against the main valve member 214 by a spring 222. The spring 222 is axially supported by a cover member 224 which is secured within the main valve member 214 by staked portions 226 around the inner edge of the main valve member 214. An O-ring 228 between the member 224 and the main valve member 214 prevents leakage therebetween.

The valve seat member 202 has a support plate 230 having a central bore 232 therein axially aligned with the bleed passage 218. A number of offset passages 233 surround the central bore 232 to permit communication between passage 170 and chamber 36. A pin-like valve actuating member 234 is reciprocally supported within the bore 232 and has an end portion 236 which extends from the valve seat member 202 and is visible in FIG. 1 adjacent extension 162.

When the fluid pressure from source 16 is inadequate to provide power braking, increased force on the brake pedal 72 by the vehicle operator causes movement of the push rod 70 and control rod 58 to the left. This shifts the bracket 120 and lever 108 also toward the left. Since the spool valve 38 is already in its leftward operative position, the added force on piston 114 causes it to move against spring 160 and cause passage 153 to move out of alignment with passage 152 which blocks further communication between inlet 14 and pressure chamber 36. This prevents an abrupt reestablishment of fluid pressure in chamber 36 in the event the fluid source again regains its pressure producing capacity.

The leftward movement of piston member 114 on the end of the spool valve 38 also moves extension member 162 against the end 236 of the actuator 234 which is shown in FIGS. 3-5. The resultant leftward movement of the actuator 234 causes a small diameter end portion 238 of it to unseat the valve 220 which normally blocks the bleed passage 218. The unseating of the valve 220 permits high pressure fluid to flow from passage 170 through ports 240 into the interior of the hollow valve member 214 and from there through the bleed passage 218 into the pressure chamber 36. The resultant reaction force on the main valve member 214 by the rapid discharge of high pressure fluid through the bleed passage 218 produces a reaction force on the valve member 214 tending to move it to the left to the open operative position shown in FIG. 5.

Once the valve member 214 has moved to an open operative position as shown in FIG. 5, an enlarged portion 242 on the pin actuator 234 holds the valve in the open position until the release of the brake pedal means 72. The enlarged diameter portion 242 has a plurality of cutouts or grooves 244 to permit fluid to flow through the bleed passage 218 during the initial opening of the valve member.

The force necessary to unseat the bleed check valve 220 is small when compared to the force necessary to unseat the larger main valve 214. Thus, when the pressure is inadequate at inlet 14 and the accumulator valve must be activated, the vehicle operator need only apply enough force to move the pin actuator 234 to the position shown in FIG. 4 and unseat valve 220. Once the discharge of fluid through the bleed passage 218 begins, the reaction force on the main valve member 214 helps to move it to the left to the fully open position.

Although the embodiment illustrated is a preferred embodiment, other embodiments may be adapted.

What is claimed is:

1. In a hydraulic power brake booster assembly including a housing having a pressure chamber therein and a fluid storage accumulator adapted to be connected to a fluid pressure source, an improved valve assembly for controlling the flow of fluid into and out of said accumulator to the pressure chamber comprising: a valve seat member having a valve passage therethrough connecting the accumulator to the pressure chamber; a first valve element normally engaging said valve seat member when in a closed operative position to block fluid flow therebetween and movable against a spring to an open operative position permitting fluid flow; said first valve element having a bleed passage therein extending between the accumulator and the pressure chamber and being aligned with the passage in said valve seat member; a second valve element normally seated against said first valve element to block fluid flow through said bleed passage; operator controlled actuating means supported in alignment with said bleed passage and movable to unseat said second valve element thereby permitting fluid to flow through said bleed passage which flow produces a reaction force on said first valve element tending to move it toward an open operative position.

2. In a hydraulic power brake booster assembly including a housing having a pressure chamber therein and a fluid storage accumulator adapted to be connected to a fluid pressure source, an improved valve assembly for controlling the flow of fluid into and out of said accumulator to the pressure chamber comprising:

a valve seat member having a valve passage therethrough connecting the accumulator to the pressure chamber; a first valve element normally engaging said valve seat member when in a closed operative position to block fluid flow therebetween and movable against a spring to an open operative position permitting fluid flow; said first valve element having a bleed passage therein extending between the accumulator and the pressure chamber and being aligned with the passage in said valve seat member; a second valve element supported by said first valve element adjacent the bleed passage opening; a spring normally biasing said second valve element against said first valve element to block fluid flow from the accumulator to the pressure chamber through said bleed passage; an actuating member supported by said valve seat member in alignment with said bleed passage for movement against said second valve element to unseat said second valve element thereby permitting fluid to flow through said bleed passage which flow produces a reaction force on said first valve element tending to move it towards an open operative position; means located on said actuating member for engaging said first valve element and maintaining the passage in said valve seat open.

3. In a hydraulic power brake booster assembly; a housing defining a pressure chamber therein for exerting fluid pressure upon a movable member; said housing having fluid inlet means and outlet means communicating with a fluid pressure source for passing high pressure hydraulic fluid to and from said pressure chamber; control valve means for establishing fluid communication between said inlet and outlet means and said pressure chamber in response to the movement of an operator-actuated brake pedal means; said control valve means having a first operative position connecting said inlet and outlet means in by-pass relation to said pressure chamber and a second operative position connecting said inlet means in fluid flow relation with said pressure chamber; fluid accumulator means connected to said pressure chamber for storing a quantity of pressurized fluid; a valve assembly for controlling the flow of fluid from said accumulator into said pressure chamber in response to movement of said operator-actuated brake pedal means; said valve assembly including a valve element normally engaging said valve seat member when in a closed operative position to block fluid flow therebetween; said valve element having a bleed passage therethrough aligned with said passage in said valve seat; a second movable valve element normally biased against said first movable valve element to block said bleed passage and prevent fluid flow therethrough; an actuating member reciprocally supported with respect to said valve seat member for engaging and unseating said second valve element when the actuating member is moved by said brake pedal means whereby pressurized fluid from said accumulator flows through said bleed passage thereby producing a reaction force on said first movable valve element to move it away from said valve seat member and towards an open position in which fluid flows between said valve seat member and said first valve element into said pressure chamber; means on said actuating member for maintaining said first valve element in an open position subsequent to the initial movement away from said valve seat member in response to said reaction force.

* * * * *